US009539794B2

(12) United States Patent
Moore et al.

(10) Patent No.: US 9,539,794 B2
(45) Date of Patent: Jan. 10, 2017

(54) BIODEGRADABLE FILM

(75) Inventors: Stephen Moore, Wigton (GB); Leo Frohlich, Wigton (GB); Paul Barker, Wigton (GB); Florian Chapalain, Wigton (GB); Lucy Cowton, Wigton (GB); Christopher Meek, Wigton (GB); Jonathan Hewitt, Wigton (GB)

(73) Assignee: INNOVIA FILMS LIMITED, Wigton, Cumbria (GB)

( * ) Notice: Subject to any disclaimer, the term of this patent is extended or adjusted under 35 U.S.C. 154(b) by 586 days.

(21) Appl. No.: 14/002,290

(22) PCT Filed: Apr. 5, 2012

(86) PCT No.: PCT/GB2012/050778
§ 371 (c)(1),
(2), (4) Date: Feb. 6, 2014

(87) PCT Pub. No.: WO2012/137014
PCT Pub. Date: Oct. 11, 2012

(65) Prior Publication Data
US 2014/0162004 A1    Jun. 12, 2014

(30) Foreign Application Priority Data
Apr. 8, 2011 (GB) .................. 1105994.6

(51) Int. Cl.
| | |
|---|---|
| *B32B 27/28* | (2006.01) |
| *B32B 1/02* | (2006.01) |
| *B32B 27/36* | (2006.01) |
| *B32B 27/12* | (2006.01) |
| *B32B 27/10* | (2006.01) |
| *B29C 47/02* | (2006.01) |
| *B05D 1/30* | (2006.01) |
| *C08J 7/04* | (2006.01) |
| *B65D 65/42* | (2006.01) |

(52) U.S. Cl.
CPC .............. *B32B 27/28* (2013.01); *B05D 1/30* (2013.01); *B05D 1/305* (2013.01); *B29C 47/02* (2013.01); *B29C 47/025* (2013.01); *B32B 1/02* (2013.01); *B32B 27/10* (2013.01); *B32B 27/12* (2013.01); *B32B 27/36* (2013.01); *B65D 65/42* (2013.01); *C08J 7/047* (2013.01); *C08J 2300/16* (2013.01); *C08J 2301/02* (2013.01); *C08J 2400/16* (2013.01); *C08J 2467/00* (2013.01); *Y10T 428/1303* (2015.01); *Y10T 428/1307* (2015.01); *Y10T 428/1334* (2015.01); *Y10T 428/1352* (2015.01); *Y10T 428/266* (2015.01); *Y10T 428/3179* (2015.04); *Y10T 428/31786* (2015.04)

(58) Field of Classification Search
CPC .......... B32B 27/10; B32B 27/12; B32B 27/36; B32B 1/02; B29C 47/02; B29C 47/025; Y10T 428/1303; Y10T 428/1307; Y10T 428/1334; Y10T 428/1352; Y10T 428/31786; Y10T 428/3179; B05D 1/30; B05D 1/305
See application file for complete search history.

(56) References Cited

U.S. PATENT DOCUMENTS

| | | | |
|---|---|---|---|
| 3,976,527 A * | 8/1976 | Thompson | B29C 47/165 156/244.19 |
| 4,076,895 A * | 2/1978 | Theno | B29C 43/222 156/244.11 |
| 6,183,814 B1 * | 2/2001 | Nangeroni | C09D 167/04 427/361 |
| 2001/0000742 A1 * | 5/2001 | Karhuketo | B32B 27/08 428/480 |
| 2007/0184220 A1 | 8/2007 | Cleveland et al. | |
| 2008/0044454 A1 * | 2/2008 | Yang | A61K 9/0056 424/439 |
| 2009/0047523 A1 * | 2/2009 | Keedy, Jr. | C08L 97/02 428/411.1 |

FOREIGN PATENT DOCUMENTS

| | | |
|---|---|---|
| EP | 2141191 A1 | 1/2010 |
| WO | 99/01278 | 1/1999 |
| WO | 00/01530 | 1/2000 |
| WO | 2009/024812 A1 | 2/2009 |
| WO | 2009/064942 A1 | 5/2009 |

OTHER PUBLICATIONS

International Preliminary Report on Patentability and Written Opinion of the International Searching Authority of International Application No. PCT/GB2012/050778 mailed Oct. 17, 2013.

\* cited by examiner

*Primary Examiner* — Walter B Aughenbaugh
(74) *Attorney, Agent, or Firm* — Ping Wang; Andrews Kurth Kenyon LLP

(57) ABSTRACT

The present application concerns a coated film comprising a substantially biodegradable substrate having a biodegradable coating thereon at a coat weight of not more than 12 gsm, as well as useful articles sealed inside a package at least partly comprising such a film, and also a process for producing a coated film comprising providing a substantially biodegradable film substrate and applying a biodegradable coating to the substrate at a coat weight of less than 12 gsm by means of a hot melt coating step.

34 Claims, No Drawings

BIODEGRADABLE FILM

This application is a national stage application of International Patent Application No. PCT/GB2012/050778, filed Apr. 5, 2012, which claims priority to United Kingdom Application No. 1105994.6, filed Apr. 8, 2011. The entirety of the aforementioned applications is incorporated herein by reference.

FIELD

The present invention concerns coated films which are biodegradable and yet have effective barrier and/or sealing properties, making them suitable for use in packaging applications. The invention also concerns processes for making such films.

BACKGROUND

Conventionally, packaging films are used to seal and protect products inside a container, or simply inside a film-formed package, from exposure to the atmosphere. In order to provide the necessary barrier and sealing properties, materials such as polyolefins, PVDC and polyethylene terephthalate have been used in the past. However, such materials are not usually compostable and there is a consequent need to provide compostable packaging films. However, it has proved difficult to find such films which have suitable barrier and/or sealing properties, and it is an object of the invention to find a solution to this problem. It is a particular object of the invention to find such a solution which does not add unreasonable cost to the manufacturing process and which does not adversely affect to an unreasonable degree other desirable properties of the film, such as optical and mechanical properties, for example.

EP-A-2141191 discloses a composite package comprising a layer of a biodegradable, compostable copolyester extrusion coated onto the surface of a biodegradable compostable cellulose film. However, the applied coatings are relatively thick and it would be desirable to provide thinner coatings whilst maintaining acceptable seal strengths.

US 2007/0184220 discloses a range of coat weights of biopolymers forming part of thicker, laminated structures for carton-board rather than filmic applications.

WO 99/01278 discloses paper-based laminates having low coat weights of a polyester amide extrusion coated thereon.

Other, thicker laminated paper-based materials with various coatings are disclosed in WO 00/01530 and in WO 2009/064942.

WO 2009/024812 discloses a sealable, peelable film comprising a coating on a cellulosic substrate of a coating composition comprising a copolymer of lactic acid and caprolactone.

DETAILED DESCRIPTION

According to the present invention there is provided a coated film having a thickness of less than 100 μm comprising a substantially biodegradable filmic substrate having a biodegradable coating thereon at a coat weight of not more than 12 gsm.

Preferably the film is a packaging film.

Preferably, the film is transparent.

The substantially biodegradable substrate may be selected from any suitably film-forming biodegradable, preferably compostable (ie biodegrading within 6 months in accordance with standard compostability test EN13432) material, or from mixtures of two or more thereof. Suitable materials include cellulose and cellulosic derivatives, compostable biopolymers, polymers of lactic acid and its derivatives, including PLA itself, polymers of hydroxyalkanoates (PHAs), biodegradeable copolyesters, polycaprolactones and starch-based materials. The substrate material may comprise a true biopolymer (cellulose or PLA for example), or suitably biodegradable synthetic polymers or suitable mixtures of two or more thereof. Preferred substrate materials include cellulose and cellulose derivatives. One suitable cellulosic substrate is a food-approved, biodegradable film available from Innovia Films Ltd under the trade name Natureflex™.

The coating may comprise any suitable material such as biodegradable polyesters, copolyesters and/or starch or starch-based coatings. Preferred coating materials are biodegradable copolyesters, polymers of Lactic acid such as PLA, and polybutylene succinate (PBS). Other suitable materials include Ecoflex & Ecovio from BASF, GS Pla from Mitsubishi and materials made from Corn starch from Biome Bioplastics limited.

Preferably, the coating does not contain any copolymer of lactic acid and caprolactone. More preferably, the coating does not contain caprolactone.

Preferably the coating is heat sealable. Accordingly, in a preferred embodiment the invention provides a coated film comprising a cellulosic substrate having a biodegradable, heat sealable coating thereon at a coat weight of not more than 12 gsm.

Biodegradable polyesters are found to be particularly suitable as coating materials. Consequently, in a preferred embodiment the invention provides a coated film comprising a cellulosic substrate having a biodegradable polyester coating thereon at a coat weight of not more than 12 gsm.

The coating may be applied on one or both sides of the film, and when the film is coated on both sides the coating on the first side may be the same as or different from the coating on the second side, and it is preferred that when different both coatings are biodegradable.

Optionally, no primer layer is provided between the biodegradable substrate and the coating, but in some cases it may be desirable to provide primer layers or other types of intermediate layer between the coating and the substrate.

The film of the invention may be laminated to one or more further substrates, each or any of which is preferably biodegradable, and which may comprise paper or cardboard, or other biopolymer materials such as PLA. Applications for such laminates include but are not limited to general packaging and lidding.

Preferably the coat weight is less than 10 gsm, more preferably less than 9 gsm, and most preferably less than 8 gsm, or even less than 6 gsm, 4 gsm or 2 gsm.

Specifically preferred coat weight ranges are from 4.5 gsm, 5 gsm or 6 gsm to 10 gsm, 9 gsm, 8 gsm, or 7 gsm.

The thickness of the coating on the film is preferably less than about 15 μm, more preferably less than about 12 μm, still more preferably less than about 10 μm, and most preferably less than about 8 μm, and can even be as low as 7 μm or less, or 6 μm or less.

Specifically preferred coating thickness ranges are from 5 μm, 5.5 μm or 6 μm to 15 μm, 12 μm, 10 μm, 8 μm or 7 μm.

The total thickness of the film is preferably less than about 75 μm, more preferably less than about 50 μm, and even more preferably less than about 35 μm or less than about 30 μm.

The substantially biodegradable substrate preferably comprises a cast film.

We have found that surprisingly good sealing properties can be provided on substantially biodegradable substrates by the provision of a coating of low coat weight (less than 12 gsm) applied by means of a hot melt coating process.

Accordingly, the invention provides a packaging film in accordance with the foregoing description in which the coating is applied by means of a hot melt or extrusion coating process.

Preferably in the process for producing packaging films according to the invention, the coating is supplied in molten form from an extruder to a hot melt coating unit comprising a melt pump feeding a die, through which the molten coating is extruded onto the substrate surface.

Preferably in the hot melt coating process the coating is extruded through a curtain die onto the substantially biodegradable substrate as it is drawn through a pair of counter-rotating rollers. Drawing of the film as it is coated ensures the necessary low coat weight.

"Curtain die" in the context of this specification includes any shape, configuration and/or number of die slots or holes which give rise to a substantially continuous falling curtain of material exiting the die. For example the die may comprise one or more co-linear (in the case of there being more than one) elongate slots and/or a co-linear series of holes.

Accordingly the invention also provides a process for producing a packaging film comprising providing a substantially biodegradable film substrate and applying a biodegradable coating to the substrate at a coat weight of less than 12 gsm by means of a hot melt coating step.

Preferably the film substrate is drawn during the coating step. Preferably the film substrate is drawn by up to at least about 10 times, preferably at least about 20 times, more preferably by at least about 50 times, or even as high as 100 or 200 times, its original dimension in the direction of draw.

Also preferably, the coating is extruded as a hot melt onto the film substrate through a curtain die.

The coating step is preferably conducted at a temperature of from about 80° C. to about 280° C., more preferably from about 90° C. to about 250° C., Preferably the zero rate viscosity of the melt is from about 90 Pa·s to 1900 Pa·s. (The viscosity may be estimated for example from an oscillatory frequency sweep rotational rheology at 190° C.)

Coated biodegradable films of the type described are found to be heat-sealable (for example at seal temperatures of from about 60° C. to about 180° C.) and to exhibit seal strengths of above 300 g, preferably above 400 g, more preferably above 500 g and most preferably above 600 g when sealed at 135° C. at 10 psi for a half second dwell time with one jaw heated. Preferably the seal strength of the coated film is greater than 300 g/25 mm, more preferably greater than 400 g/25 mm, still more preferably more than about 500 g/25 mm, and most preferably more than about 600 g/25 mm.

The coated films used in the packaging article of the invention are preferably transparent, but can include pigmented, coloured or metallised films. Where transparent the film has wide angle haze of less than about 10%, more preferably less than about 8%, most preferably less than about 6%.

The films of the invention exhibit good barrier properties. Preferably the films of the invention exhibit a WVTR (Tropical, 38° C., 90% RH) of less than 20 gsm/day, more preferably less than 18 gsm/day and most preferably less than 15 gsm/day.

Furthermore, we have also found that the films of the invention provide considerably improved seal strengths compared to the uncoated substrate. Thus, the films of the invention preferably exhibit seal strengths of at least about 10%, more preferably at least about 50% and most preferably at least about 100% higher than those of the uncoated biodegradable substrate.

Also provided in accordance with the invention is a useful article sealed inside a package at least partly comprising the biodegradable coated film of the invention. Characteristics of the coated films used in the packaging article of the invention such as moisture barrier, aroma barrier, seal strength, transparency, coating adhesion, anti-mist and other properties can be improved or adjusted by choosing or blending in an appropriate ratio the copolymers or by incorporating one or more further additives into the coating composition.

The film substrates and/or the coated films of the invention may comprise any number of suitable functional or aesthetic additives, selected from one or more of polyvinylidene chloride, nitrocellulose, paraffin waxes, silicas, china clays, polyesters, candelillia wax, montan wax, microcrystalline wax, hydrogenated caster oil, behenic acid, oxidised polyethylene wax, stearic acid, glycerine mono stearate, carnauba wax, maleic acid, ethyl cellulose, styrene maleic anhydride, polyvinyl acetates, zinc stearate, dicyclohexylphthalate, acetyl tributyl citrate, polyvinyl chloride/polyvinyl acetate copolymers, amide waxes, glycerol ester of rosin and dymerex polymerised rosin.

The biodegradable coating may also be provided with one or more functional or aesthetic additives, such as slip and/or antiblocking agents, for example.

One coated film in accordance with the invention also or instead comprises in the coating composition at least one styrenic copolymer, preferably in an amount of less than about 3% w/w, more preferably less than about 2% w/w, and most preferably less than about 1% w/w of the dry weight of the coating composition.

Preferably, the film of the invention is certifiably biodegradable. This means either that the film is completely biodegradable, or the total weight of non-biodegradable components in the film is sufficiently low for the film as a whole to be considered biodegradable according to conventional standards at the present time.

The invention will now be more particularly described with reference to the following Examples.

EXAMPLES

In Example 1 and Example 2, a 23 μm food-approved cellulosic substrate available under the trade name Natureflex from Innovia Films Ltd (23NK) was used. The Natureflex substrate was coated by means of a hot melt curtain coating process with a variety of biodegradable coatings. Coating was effected using machinery supplied by Inatec GMbH, Schneiderstrasse 73, D-40764, Langenfeld, Germany.

The trial involved running two biodegradable polymers sourced from one supplier. The polymers were coated onto 23NK film targeting 3 different coat weights. The coat weight targets were 12-10 gsm, 6-5 gsm and 3-2 gsm. The two main properties assessed during the trial were i) Adhesion to the base film (23NK) and ii) sealability of the film, both A-A and A-B. The Heatseals were performed on a setting that measured 120° C. tested using a temperature gauge.

Polymers

Two biopolymer coatings were used in these Examples, Biopolymer 1 being a biodegradable polyester with vegetable oil monomers, and Biopolymer 2 being a biodegradable polyester.

The polymer was extruded through the die and then dropped approx 50 mm before making contact with the film and running through nip rollers.

Example 1

Bio-Polymer 2

Conditions

| Extruder Temperature | 220° C. |
|---|---|
| Hose Temperature | 200° C. |
| Main Pump Temperature | 220° C. |
| Melt Pump Temperature | 220° C. |
| Die Temperature | 220° C. |

Temperatures lowered from 220° C. to 210° C. to run 3 & 6 gsm coat weights.

Observations—The polymer ran well giving a good curtain. The polymer gave good adhesion under tape test to NK, and a tearing heat seal both for biopolymer-biopolymer and biopolymer-NK.

Example 2

Bio-Polymer 1

Conditions

| Extruder Temperature | 230° C. |
|---|---|
| Hose Temperature | 220° C. |
| Main Pump Temperature | 230° C. |
| Melt Pump Temperature | 230° C. |
| Die Temperature | 230° C. |

Observations—The polymer gave good adhesion under tape test to NK possibly best to date, and a tearing heat seal both for biopolymer-biopolymer and biopolymer-NK.

The samples evaluated were
Bio-Polymer 1, at 3 gsm, 6 gsm, & 12 gsm
Bio-Polymer 2, at 3 gsm, 6 gsm, & 12 gsm The samples were tested for Heat seal strength, Hot tack, Jaw Release, and WVP.

The finished film targets for the trials were to determine which of the polymers achieved a heat seal of 1000 g/25 mm, secondly what was the minimum coat weight required to do so and also to assess any potential effect on other film properties.

With regards to both polymers, neither contains any additional additives such as slip or antiblock, although as mentioned herein it is possible to incorporate one or more additives if desired.

1) Heatseal Strength (NK Specification—225 g/25 mm at 135° C.)
   a) From the heatseal strengths an average of greater than 1000 g/25 mm was achieved for polymer-polymer heatseals for BIO-POLYMER 1 at 12 gsm at both 110° C. & 135° C., and for BIO-POLYMER 2 at 110° C. only.
   b) Individual heatseals of >1000 g/25 mm were observed for polymer-polymer for the BIO-POLYMER 1 at both 3 & 6 gsm coat weights.
   c) Very low heatseals of <100 g/25 mm were observed. The mode of failure would indicate that this was due to a defect in the seal propagating a tear and therefore an artificially low result.
   d) For NK-Polymer the average heatseal strength is not significantly affected by polymer coat weight with BIO-POLYMER 2—circa 400 g/25 mm at both temperatures and BIO-POLYMER 1 circa 400 g/25 mm at 110° C. and circa 550-600 g/25 mm at 135° C.
   e) The heatseal strength was recorded as an average of 10 seals. The mode of failure was noted for each heatseal.
   f) The modes of failure were split into 3 broad categories:
      i) Traditional Peeling seal with no delamination (Type g in results). (for this purpose delamination is used to describe where the polymer extrusion coating pulls off from the cello substrate)
      ii) Weld seals where the seal is destroyed (Types e & f)
      iii) Peeling seal with delamination of polymer from cellophane substrate. In this instance some seals peeled open over the complete length of the seal and in others this formed a prelude to a weld like tearing seal. (Types a-d)
   g) The majority of the heatseals resulted in destruction of the film either by tearing of the seal or delamination of the polymer layer.
   h) From the results it can be seen that the BIO-POLYMER 1 polymer primary mode of failure is category ii) above. Whereas for BIO-POLYMER 2 it is category iii).
   i) Analysing the pulled heatseals using pyridine indicates that the point of failure is at the cellophane-PVdC interface as PVdC is found on the delaminated polymer and not on the cellophane film.

2) Hot Tack
   j) In all cases the film samples passed with the 150 g weight indicating good hot tack properties.

3) Hot Seal Jaw Release, Typical Specification—≤30 g/5 cm$^2$
   k) The JR increased with increasing coat weight for both polymers for a given temperature.
   l) BIO-POLYMER 1 performed better than the corresponding BIO-POLYMER 2 sample.
   m) The JR decreased with increasing temperature for both polymers for a given coat weight.

Results

Heatseal Strength—NK-Polymer, 135° C., 10 psi, 0.5 Seconds

| | Biopolymer | | | | | |
|---|---|---|---|---|---|---|
| | BIO-POLYMER 2 | | | BIO-POLYMER 1 | | |
| Coat Wgt | 3 gsm | 6 gsm | 12 gsm | 3 gsm | 6 gsm | 12 gsm |
| Result 1 | 389 $^a$ | 411 $^f$ | 412 $^d$ | 511 $^f$ | 409 $^e$ | 481 $^f$ |
| Result 2 | 455 $^b$ | 344 $^f$ | 209 $^d$ | 711 $^e$ | 587 $^e$ | 555 $^a$ |
| Result 3 | 427 $^a$ | 430 $^f$ | 468 $^d$ | 561 $^e$ | 822 $^f$ | 698 $^f$ |
| Result 4 | 413 $^a$ | 408 $^a$ | 234 $^d$ | 615 $^e$ | 474 $^e$ | 908 $^f$ |
| Result 5 | 418 $^b$ | 410 $^a$ | 423 $^d$ | 440 $^e$ | 561 $^f$ | 473 $^a$ |
| Result 6 | 448 $^a$ | 425 $^a$ | 464 $^g$ | 497 $^e$ | 542 $^f$ | 630 $^f$ |
| Result 7 | 375 $^b$ | 429 $^f$ | 466 $^c$ | 640 $^e$ | 700 $^f$ | 533 $^a$ |
| Result 8 | 478 $^a$ | 423 $^f$ | 539 $^d$ | 327 $^e$ | 730 $^f$ | 484 $^a$ |
| Result 9 | 481 $^f$ | 421 $^f$ | 260 $^d$ | 610 $^e$ | 613 $^f$ | 577 $^a$ |
| Result 10 | 461 $^g$ | 375 $^f$ | 238 $^d$ | 464 $^e$ | 652 $^f$ | 577 $^a$ |
| Average | 434 | 408 | 371 | 538 | 609 | 591 |
| Std Dev | 36.1 | 27.6 | 122.2 | 112.5 | 122.9 | 131.5 |

Heatseal Strength—Polymer-Polymer, 135° C., 10 psi, 0.5 Seconds

|  | Biopolymer | | | | | |
|---|---|---|---|---|---|---|
|  | BIO-POLYMER 2 | | | BIO-POLYMER 1 | | |
| Coat Wgt | 3 gsm | 6 gsm | 12 gsm | 3 gsm | 6 gsm | 12 gsm |
| Result 1 | 466 [b] | 514 [g] | 700 [c] | 1224 [f] | 5 [f] | 1421 [f] |
| Result 2 | 516 [d] | 491 [a] | 462 [c] | 1165 [f] | 639 [f] | 1238 [f] |
| Result 3 | 473 [a] | 505 [b] | 655 [g] | 762 [f] | 661 [f] | 1970 [f] |
| Result 4 | 519 [a] | 362 [b] | 694 [g] | 662 [f] | 753 [a] | 1485 [f] |
| Result 5 | 484 [a] | 435 [a] | 778 [c] | 1257 [f] | 743 [a] | 2269 [e] |
| Result 6 | 532 [b] | 405 [a] | 747 [g] | 543 [b] | 564 [f] | 1854 [e] |
| Result 7 | 501 [a] | 384 [b] | 813 [d] | 993 [f] | 938 [f] | 1078 [e] |
| Result 8 | 466 [a] | 451 [g] | 857 [g] | 335 [f] | 683 [f] | 2226 [e] |
| Result 9 | 458 [a] | 945 [e] | 428 [c] | 640 [f] | 17 [f] | 1011 [f] |
| Result 10 | 480 [a] | 593 [e] | 453 [c] | 858 [g] | 1302 [f] | 928 [f] |
| Average | 489 | 508 | 659 | 844 | 630 | 1548 |
| Std Dev | 25.9 | 168.2 | 157.1 | 311.2 | 387.2 | 501.1 |

Heatseal Strength—NK-Polymer, 110° C., 10 psi, 0.5 Seconds

|  | Biopolymer | | | | | |
|---|---|---|---|---|---|---|
|  | BIO-POLYMER 2 | | | BIO-POLYMER 1 | | |
| Coat Wgt | 3 gsm | 6 gsm | 12 gsm | 3 gsm | 6 gsm | 12 gsm |
| Result 1 | 424 [a] | 383 [b] | 286 [c] | 426 [f] | 383 [a] | 427 [g] |
| Result 2 | 409 [a] | 410 [b] | 464 [g] | 447 [f] | 401 [a] | 439 [a] |
| Result 3 | 442 [a] | 437 [a] | 412 [c] | 407 [g] | 495 [f] | 393 [g] |
| Result 4 | 418 [a] | 361 [a] | 255 [g] | 411 [g] | 604 [f] | 432 [a] |
| Result 5 | 409 [a] | 383 [a] | 311 [c] | 564 [f] | 404 [a] | 428 [g] |
| Result 6 | 421 [a] | 430 [a] | 400 [g] | 631 [f] | 406 [a] | 455 [g] |
| Result 7 | 388 [a] | 408 [a] | 456 [g] | 427 [f] | 384 [a] | 43 [b] |
| Result 8 | 417 [a] | 433 [a] | 455 [g] | 401 [g] | 1011 [f] | 421 [g] |
| Result 9 | 388 [a] | 381 [a] | 277 [c] | 392 [g] | 525 [f] | 431 [g] |
| Result 10 | 413 [a] | 411 [a] | 483 [c] | 415 [f] | 566 [f] | 432 [a] |
| Average | 413 | 404 | 380 | 452 | 518 | 390 |
| Std Dev | 16.1 | 25.6 | 88.4 | 79.7 | 191.1 | 122.8 |

Heatseal Strength—Polymer-Polymer, 110° C., 10 psi, 0.5 Seconds

|  | Biopolymer | | | | | |
|---|---|---|---|---|---|---|
|  | BIO-POLYMER 2 | | | BIO-POLYMER 1 | | |
| Coat Wgt | 3 gsm | 6 gsm | 12 gsm | 3 gsm | 6 gsm | 12 gsm |
| Result 1 | 391 [a] | 483 [a] | 843 [a] | 482 | 438 [g] | 580 [e] |
| Result 2 | 372 [a] | 498 [a] | 1049 [a] | 477 [g] | 516 [a] | 664 [e] |
| Result 3 | 362 [a] | 526 [a] | 1059 [a] | 35 [e] | 466 [a] | 3715 [e] |
| Result 4 | 390 [a] | 538 [a] | 1025 [a] | 488 [d] | 477 [a] | 1662 [e] |
| Result 5 | 383 [a] | 534 [a] | 1045 [a] | 597 [d] | 432 [a] | 682 [f] |
| Result 6 | 368 [b] | 462 [a] | 1094 [a] | 643 [a] | 526 [a] | 1320 [e] |
| Result 7 | 411 [a] | 498 [a] | 1033 [a] | 806 [d] | 442 [a] | 634 [a] |
| Result 8 | 410 [a] | 455 [a] | 1217 [a] | 497 [d] | 496 [a] | 610 [e] |
| Result 9 | 380 [a] | 510 [a] | 1149 [a] | 732 [d] | 559 [a] | 1433 [e] |
| Result 10 | 398 [a] | 557 [a] | 696 [a] | 148 [a] | 476 [a] | 2269 [e] |
| Average | 398 | 506 | 1021 | 490 | 483 | 1357 |
| Std Dev | 16.6 | 33.2 | 149.3 | 239.6 | 41.5 | 1006.2 |

Modes of Failure a. Peeling seal with biopolymer delaminating from NK on both sides of heatseal.
b. Peeling seal with tear initiating from one side edge into rest of seal area.
c. Seal tear initiated but complete tear not achieved as outer biopolymer layer delaminated pulling off as a complete film.
d. Biopolymer delaminated from both sides of the NK before seal tore completely.
e. Seal tore completely within first 10% of opening (Weld Seal).
f. Seal tore completely after initially peeling (Weld Seal).
g. Normal Peeling type seal.

Hot Tacks (135° C.-10 psi-2.5 sec g/70 mm)

|  | BIO-POLYMER 2 | | BIO-POLYMER 1 | |
|---|---|---|---|---|
|  | Biopolymer-Biopolymer | Biopolymer-NK | Biopolymer-Biopolymer | Biopolymer-NK |
| 3 gsm | >150 | >150 | >150 | >150 |
| 6 gsm | >150 | >150 | >150 | >150 |
| 12 gsm | >150 | >150 | >150 | >150 |

Hotseal Jaw Release (g/5 cm$^2$)

|  | BIO-POLYMER 2 | | | BIO-POLYMER 1 | | |
|---|---|---|---|---|---|---|
|  | 110° C. | 130° C. | 150° C. | 110° C. | 130° C. | 150° C. |
| 3 gsm | 51 | 53 | 19 | 33 | 32 | 12 |
| 6 gsm | 70 | 64 | 33 | 56 | 35 | 18 |
| 12 gsm | 143 | 122 | 59 | 64 | 51 | 41 |

WVP Tropical 38° C./90% RH g/m$^2$/24 hrs

|  | BIO-POLYMER 2 | BIO-POLYMER 1 |
|---|---|---|
| 3 gsm | 13 | 11 |
| 6 gsm | 11 | 9 |
| 12 gsm | 13 | 13 |

Example 3

Bio-Polymers 3 and 4

A 40 μm food-approved regenerated cellulosic film substrate was used.

The film substrate was coated by means of a standard extrusion coating process with a variety of biodegradeable coatings. The coating machinery used consisted of an extruder feeding molten polymer to a flat die suspended above the film substrate. A curtain of polymer extruded from the die contacted the film substrate immediately before a nip between two rollers, one of which was a water cooled smooth finish chrome roller. As the polymer coating contacted the cooled roller, it solidified.

The trial involved running two commercially available biodegradable polymers:

BIO-POLYMER 3: Danimer 26806 supplied by Danimer Scientific
BIO-POLYMER 4: Ecoflex SBX 7025 supplied by BASF The polymers were coated onto the film substrate at various coat weights ranging from 7 gsm to 11 gsm.

The properties assessed during the trial included: adhesion to the base film, wide angle haze (WAH), heat seal strength at 100° C. and 135° C., hot tack, WVP and tear resistance in the machine direction (MD) and transverse direction (TD).

Results

| Resin | BIO-POLYMER 3 | BIO-POLYMER 3 | BIO-POLYMER 3 | BIO-POLYMER 4 | BIO-POLYMER 4 |
|---|---|---|---|---|---|
| Base reel | 2 | 2 | 2 | 2 | 2 |
| Corona | 2 | 3.8 | 3.8 | 3.8 | 3.8 |
| Line speed M/Min | 80 | 80 | 100 | 50 | 80 |
| Temperature profile ° C. | — | — | — | n/a | n/a |
| Chill roll temperature ° C. | 22 | 29 | 29 | 22 | 22 |
| Pressure of nip rolls (bars) | 6.5 | 6.5 | 6.5 | 6.5 | 6.5 |
| Thickness (μm) | 50 | 47 | 47 | 47 | 45 |
| Coat gain (gsm) | 11 | 10 | 9 | 11 | 7 |
| WAH (%) | 30.1 | 25.9 | 27.2 | 9.4 | 11.7 |
| Adhesion (g/25 mm) | — | — | 72 | 275 | 405 |
| Seals 100° C. (g/25 mm) * | 773 | 728 | 693 | 1470 | 749 |
| Seals 135° C. (g/25 mm) * | 799 | 802 | 723 | 1479 | 1389 |
| Hot tack | — | — | 150 | — | 150 |
| Seals to PLA | Weld seal | Weld seal | Weld seal | Weld seal | Weld seal |
| Dry seals ** | — | — | 641 | — | 264 |
| Wet seals-tap water ** | — | — | 635 | — | 226 |
| Wet seals-boiling water ** | — | — | 564 | — | 287 |
| WVP - 25° C. 75RH - 24 h | — | — | 201 | — | 109 |
| Tear resistance MD (%) | 3.5 | 3.3 | 4.0 | 3.0 | 2.6 |
| Tear resistance TD (%) | 2.7 | 2.5 | 2.9 | 2.3 | 2.2 |
| Stiffness MD | — | — | 91 | — | 89 |

\* 0.5 s, 10 psi
\*\* 150° C., 0.2 s, 40 psi, 1 min in water when specified

It will be appreciated that the foregoing represents specific examples of the invention, which is more particularly defined in the claims which follow.

The invention claimed is:

1. A coated film having a thickness of less than 100 μm comprising a substantially biodegradable filmic substrate having a biodegradable coating thereon at a coat weight of not more than 12 gsm;
    wherein the coated film has a WVTR (Tropical, 38° C., 90% RH) of less than 20 gsm/day; and/or
    wherein the coated film is heat sealable, exhibiting a seal strength greater than 300 g/25 mm when sealed at 135° C. with a half second dwell time between sealing jaws, one of which is heated.

2. The coated film according to claim 1, wherein the substantially biodegradable filmic substrate is selected from a film-forming biodegradable material, or from mixtures of two or more thereof.

3. The coated film according to claim 2, wherein the substantially biodegradable film-forming material is selected from the group consisting of cellulose and cellulosic derivatives, polymers of lactic acid and its derivatives, polymers of hydroxyalkanoates (PHAs), biodegradeable copolyesters, polycaprolactones and starch-based materials.

4. The coated film according to claim 1, wherein the coating comprises a biodegradable polyester and/or copolyester and/or starch or a starch-based material.

5. The coated film according to claim 1, coated only on one side.

6. The coated film according to claim 1, wherein no primer layer is provided between the biodegradable substrate and the coating.

7. The coated film according to claim 1, laminated to one or more further substrates.

8. The coated film according to claim 1, wherein the coat weight is less than 10 gsm.

9. The coated film according to claim 1, wherein the thickness of the coating on the film is less than about 20 μm.

10. The coated film according to claim 1, wherein the total thickness of the film is less than about 75 μm.

11. The coated film according to claim 1, wherein the substantially biodegradable substrate comprises a cast film.

12. The coated film according to claim 1, in which the coating is applied by means of a hot melt coating process.

13. The coated film according to claim 12, wherein in the hot melt coating process the coating is extruded through a curtain die onto the substantially biodegradable substrate as it is drawn through a pair of counter-rotating rollers.

14. The coated film according to claim 1, having a seal strength greater than 400 g/25 mm when sealed at 135° C. with a half second dwell time between sealing jaws, one of which is heated.

15. The coated film according to claim 1, having a WVTR (Tropical, 38° C. 90% RH) of less than 18 gsm/day.

16. The coated film according to claim 1, having a seal threshold of at least about 10% higher than that of the uncoated biodegradable substrate.

17. A useful article sealed inside a package at least partly comprising the coated film according to claim 1.

18. A process for producing a coated film comprising:
    providing a substantially biodegradable film substrate; and
    applying a biodegradable coating to the film substrate at a coat weight of less than 12 gsm by means of a hot melt coating step to provide a coated film having a thickness of less than 100 μm; and a WVTR (Tropical, 38° C., 90% RH) of less than 20 gsm/day; and/or is heat sealable, exhibiting a seal strength greater than 300 g/25 mm when sealed at 135° C. with a half second dwell time between sealing jaws, one of which is heated.

19. The process according to claim 18, wherein the film substrate is drawn during the coating step.

20. The process according to claim 18, wherein the coating is extruded as a hot melt onto the film substrate through a curtain die.

21. The process according to claim 18, wherein the coating step is conducted at a temperature of from about 80° C. to about 280° C.

22. The process according to claim 18, wherein the coating step involves the use of water in the nip to prevent the polymer from sticking to the nip rollers.

23. The process according to claim 18, wherein the coating step involves the use of water in the nip to improve the optical properties of the coated film.

24. The coated film according to claim 1, wherein the coat weight is less than 9 gsm.

25. The coated film according to claim 1, wherein the coat weight is less than 8 gsm.

26. The coated film according to claim 1, wherein the thickness of the coating on the film is less than about 15 μm.

27. The coated film according to claim 1, wherein the thickness of the coating on the film is less than about 12 μm.

28. The coated film according to claim 1, wherein the total thickness of the film is less than about 50 μm.

29. The coated film according to claim 1, having a seal strength of more than about 500 g/25 mm when sealed at 135° C. with a half second dwell time between sealing jaws, one of which is heated.

30. The coated film according to claim 1, having a seal strength of more an about 600 g/25 mm when sealed at 135° C. with a half second dwell time between sealing jaws, one of which is heated.

31. The coated film according to claim 1, having a WVTR (Tropical, 38° C., 90% RH) of less than 15 gsm/day.

32. The coated film according to claim 1, having a seal threshold of at least about 50% higher than that of the uncoated biodegradable substrate.

33. The coated film according to claim 1, having a seal threshold of at least about 100% higher than that of the uncoated biodegradable substrate.

34. The process according to claim 18, wherein the coating step is conducted at a temperature of from about 90° C. to about 250° C.

* * * * *